United States Patent [19]

Yeager et al.

[11] Patent Number: 4,975,172

[45] Date of Patent: Dec. 4, 1990

[54] IONOMERIC POLYMERS WITH IONOMER MEMBRANE IN PRESSURE TOLERANT GAS DIFFUSION ELECTRODES

[75] Inventors: Ernest B. Yeager, Cleveland; Donald A. Tryk, Cleveland Heights, both of Ohio; M. Sohrab Hossain, Marlborough, Mass.; Arnold Z. Gordon, Beachwood, Ohio

[73] Assignee: Westinghouse Electric Corp., Pittsburgh, Pa.

[21] Appl. No.: 435,493

[22] PCT Filed: Mar. 2, 1988

[86] PCT No.: PCT/US88/00621

§ 371 Date: Oct. 12, 1989

§ 102(e) Date: Oct. 12, 1989

[87] PCT Pub. No.: WO88/06642

PCT Pub. Date: Sep. 7, 1988

[51] Int. Cl.[5] ............................................. C25B 11/00
[52] U.S. Cl. .................................... 204/283; 204/252; 204/290 R; 204/291; 204/294; 429/41; 429/42; 429/43
[58] Field of Search ............... 204/252, 277, 278, 275, 204/282, 283, 290 R, 291, 294, 296

[56] References Cited

U.S. PATENT DOCUMENTS

| | | | |
|---|---|---|---|
| 3,124,520 | 3/1964 | Juda | 204/86 |
| 3,284,238 | 11/1966 | White | 136/86 |
| 4,090,931 | 5/1978 | Motani et al. | 204/260 |
| 4,400,452 | 8/1983 | Bruder | 429/152 |
| 4,407,905 | 10/1983 | Takeuchi et al. | 429/42 |
| 4,514,474 | 4/1985 | Momyer et al. | 429/27 |
| 4,528,249 | 7/1985 | Galbraith | 424/15 |
| 4,614,575 | 9/1986 | Juda et al. | 204/265 |
| 4,615,954 | 8/1986 | Solomon et al. | 429/27 |
| 4,722,773 | 2/1988 | Plowman et al. | 204/98 |
| 4,732,660 | 3/1988 | Plowman et al. | 204/265 |

FOREIGN PATENT DOCUMENTS

1226507 3/1971 United Kingdom.

OTHER PUBLICATIONS

DeCastro et al., "Electrodes Coated with Polymer Networks Cross-Linked by γ-Irradiation," J. Electroanal, Chem., vol. 138, pp. 197-200 (1982).

Sheibley et al., "Cross-Linked Polyvinyl Alcohol Films as Alkaline Battery Separators," J. Electrochem. Soc., vol. 130, No. 2, pp. 255-259 (Feb. 1983).

Szentirmay et al., "Chemical Properties and Film Casting of Radiation-Grafted Ion Containing Polymers," J. Electrochem. Soc., vol. 131, No. 7, pp. 1652-1657 (Jul. 1984).

Fujita et al., "An Electrochemical Oxygen Separator Using an Ion Exchange Membrane as the Electrolyte," J. Appl. Electrochem., 16, 935 (1986).

DeCastro et al., "Electrodes with Polymer Network Films Formed by γ-Irradiation Cross-Linking," Anal. Chem., vol. 59, pp. 134-139 (1987).

The Electrosynthesis Co., Inc.—RAIPORE ® membrane information sheet (undated).

Primary Examiner—John F. Niebling
Assistant Examiner—Kathryn Gorgos
Attorney, Agent, or Firm—D. Schron

[57] ABSTRACT

Gas diffusion electrodes and gas generating or consuming electrochemical cells utilizing the same are disclosed. The electrode includes an electronically conductive and electrochemically active porous body defining respective gas and electrolyte contacting surfaces, with an ionomeric ionically conductive gas impermeable layer covering the electrolyte contacting surface. The layer includes a layer of a hydrophilic ionic polymer applied directly to the electrolyte contacting surface and a membrane of a hydrophilic ion exchange resin overlying the polymer layer.

35 Claims, 4 Drawing Sheets

FIG. 6
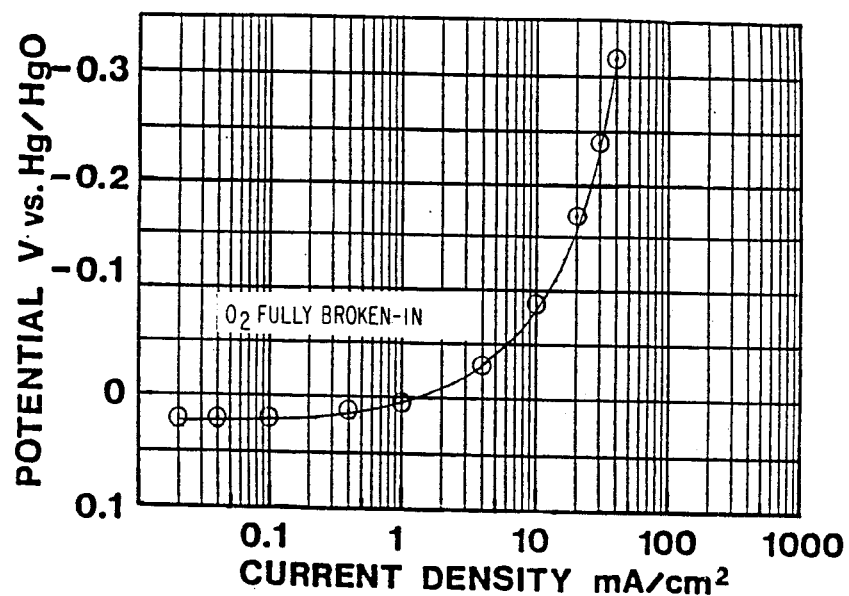
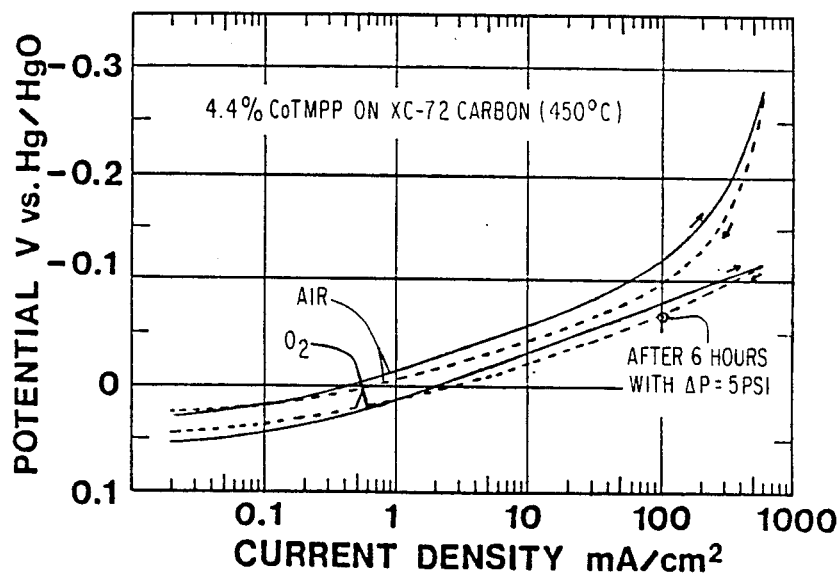
FIG. 7

IONOMERIC POLYMERS WITH IONOMER MEMBRANE IN PRESSURE TOLERANT GAS DIFFUSION ELECTRODES

CROSS-REFERENCE TO RELATED APPLICATIONS

The present application is based on PCT International application No. PCT/U.S. Pat. No. 88/00621, filed Mar. 2, 1988, which is a continuation-in-part of copending, commonly assigned application Ser. No. 20,748, filed Mar. 2, 1987 and now abandoned.

BACKGROUND OF THE INVENTION

1. Field of the Invention

This invention relates generally to gas diffusion electrodes and, more particularly, this invention relates to gas diffusion electrodes adapted for use in electrochemical cells utilizing an aqueous alkaline electrolyte and consuming or generating a gas via the electrochemical process occurring within the gas diffusion electrode.

2. Description of Related Art

The use of gas diffusion electrodes in fuel cells and metal-air batteries is well known. Gas diffusion electrodes have also been used in the electrolysis, either oxidation or reduction, of gaseous reactants. It is also possible to generate gases in such electrodes. In general, gas diffusion electrodes take the form of solid porous (gas and liquid permeable) bodies formed at least in part of an electronically conductive, electrochemically active material, and may include a catalyst. Such electrodes generally define an electrolyte contacting surface and a gas contacting surface. Electrochemical oxidation and reduction occur at the points in the electrode where the gas to be oxidized or reduced contacts both the electrolyte and the active material of the electrode. In the case of gas generation, electrolyte contacts the active material and gas is generated at this interface.

Electrochemical cells utilizing such electrodes generally comprise the gas diffusion electrode, a spaced counter electrode, a liquid electrolyte (which is generally aqueous) which contacts both the counter electrode and the gas diffusion electrode, and a gas which contacts the gas diffusion electrode either (1) for reduction or oxidation of the gas or (2) produced via electrolytic generation. Circuit connections are disposed between the counter and gas diffusion electrodes. Additionally, the counter electrode may also be a gas diffusion electrode. A well known example of such a design is the $H_2/O_2$ fuel cell.

Electrochemical batteries, for example, the metal-air type, commonly utilize either an aqueous alkaline or neutral (e.g., saline) electrolyte, while fuel cells may commonly utilize either acidic electrolytes or alkaline electrolytes. Other types of electrolytes are also used, depending upon the specific gas which is consumed or generated.

The use in electrochemical batteries of an oxygen-containing gas such as air which is reduced at the gas diffusion electrode is well known. However, the gas need not be oxygen-containing nor need it be reduced at the gas diffusion electrode. For example, hydrogen gas is oxidized in some fuel cells. The present invention is generally applicable to all such types of gas diffusion electrodes and cells.

The electronically conductive material in a gas diffusion electrode typically may be carbon. Additionally, a wide variety of catalysts such as platinum or transition metal organometallic catalysts (such as porphyrins) are available.

In various applications, it is desirable that either or both the liquid electrolyte and the gaseous electrode reactant be flowed through the body of the cell over the electrode surfaces. Flowing electrolyte and/or flowed gaseous reactant are of course accompanied by a pressure drop across the cell, especially on the electrolyte side. This can be lead to excess pressures either on the gas-side or the electrolyte-side of the electrode. Furthermore, it may be desirable in certain circumstances to operate at an elevated gas pressure with respect to the electrolyte pressure. One example of such a situation would be one in which the performance is increased by pressurizing the gaseous reactant. In battery and fuel cell applications, it is desirable to obtain as high a cell voltage as possible at any given current density. One means of accomplishing this is to utilize a relatively high gas pressure or flow rate.

The use of a porous (e.g. typically 30–60% porosity) gas diffusion electrode, however, poses difficult flow management problems. When gas pressure exceeds liquid electrolyte pressure by a sufficient amount, "blow-through" of gas through the electrode into the liquid electrolyte results. In conventional gas diffusion electrodes, this so-called "blow-through pressure" is usually much lower than is desirable for tolerance of substantial differential pressures between the gas and liquid sides of the cell.

For example, while it may be desirable to operate a cell at a gas vs. liquid differential pressure of up to 10 psi or more, typical air cathodes exhibit a gas blow-through pressure of less than about 0.25 psi. If the differential pressure exceeds the blow-through pressure, pumping of gas into the liquid electrolyte may result. (Typical blow-through pressures range from 0–1 psi, and are determined primarily by interfacial tension and pore size distribution.)

Conversely, if the liquid electrolyte pressure is higher than the gas pressure and the differential pressure exceeds the liquid bleed-through pressure, liquid may be pumped into the gas side of the cell, which may result in liquid in the gas manifold, with consequent pumping problems and a decrease in cell performance and useful cell life due to flooding of the active layer of the electrode.

In gas-generating cells, it is customary for the gas to be generated on the front face (electrolyteside) of the electrode. The gas is thus generated as bubbles in the electrolyte, which can lead to removal of electrolyte from the cell and increased ohmic losses. Generation of gas in a gas diffusion electrode is more desirable because the gas can exit the cell directly through the back of the electrode. Operation in this mode would require a certain amount of pressure tolerance. Even higher pressure tolerance would be required if the gas is generated in a pressurized state.

If the differential pressure between the gas and liquid sides of an electrochemical cell using a porous gas diffusion electrode is to be maintained at a low level, impractical pressure management problems result, especially in view of the fact that pressure levels vary from point to point on each side of the electrode.

The problems described are not readily amendable to correction by the use of a gas barrier material between the gas and electrolyte sides of the electrode, since such barriers tend to block the flow of electrolytic ions through the electrode and also strongly contribute to voltage losses or do not allow operation at a sufficiently high current density for the desired application. It is desirable to maintain the potential across the electrode at as positive a level as possible while maintaining as high a current density as possible. For example, it may be desired to operate a cell at a current density of up to as high as 500 mA/cm$^2$, typically at 100 mA/cm$^2$, while minimizing the voltage loss across the electrode. A voltage loss of less than 0.05 volts is preferred, with voltage losses of up to 0.25 volts being generally acceptable.

One approach to solving these problems is disclosed in Juda and Ilan U.S. Pat. No. 4,614,575 (Sept. 30, 1986), which involves the use of nonionic polymeric hydrogel as a layer applied by painting onto the electrolyte side of the gas diffusion electrode. The maximum pressure tolerance disclosed by the Juda, et al. patent is less than or equal to 40 inches of water (1.44 psi or 10.0 kPa), which is significantly less than that possible with the present invention.

SUMMARY OF THE INVENTION

It is an object of the present invention to overcome one or more of the problems described above.

According to the present invention, an ionomeric, ionically conductive, substantially gas impermeable layer is disposed over substantially the entire electrolyte contacting surface of a gas diffusion electrode adapted for use in a gas generating or consuming electrochemical cell utilizing a liquid electrolyte. The layer comprises a layer of a hydrophilic ionic polymer covered by a membrane of a hydrophilic ion exchange resin.

The invention also comprehends an electrochemical cell comprising the coated gas diffusion electrode spaced from a counter electrode and in contact with a liquid electrolyte. A gas to be oxidized, reduced or generated is in contact with the gas side of the electrode, and circuit connections are disposed between the counter and gas diffusion electrodes.

The electrode and cell of the invention are capable of operating at very high gas vs. electrolyte differential pressures at high current densities without significant voltage loss.

Other objects and advantages of the invention will be apparent to those skilled in the art from a review of the following detailed description taken in conjunction with the drawings and the appended claims.

BRIEF DESCRIPTION OF THE DRAWINGS

FIG. 6 is a polarization curve exhibited by an electrode with a cation exchange membrane for comparison with FIGS. 7 and 8;

FIG. 7 is a series of polarization curves exhibited by an embodiment of an electrode made according to the invention.

DETAILED DESCRIPTION OF THE INVENTION

Figure 1:
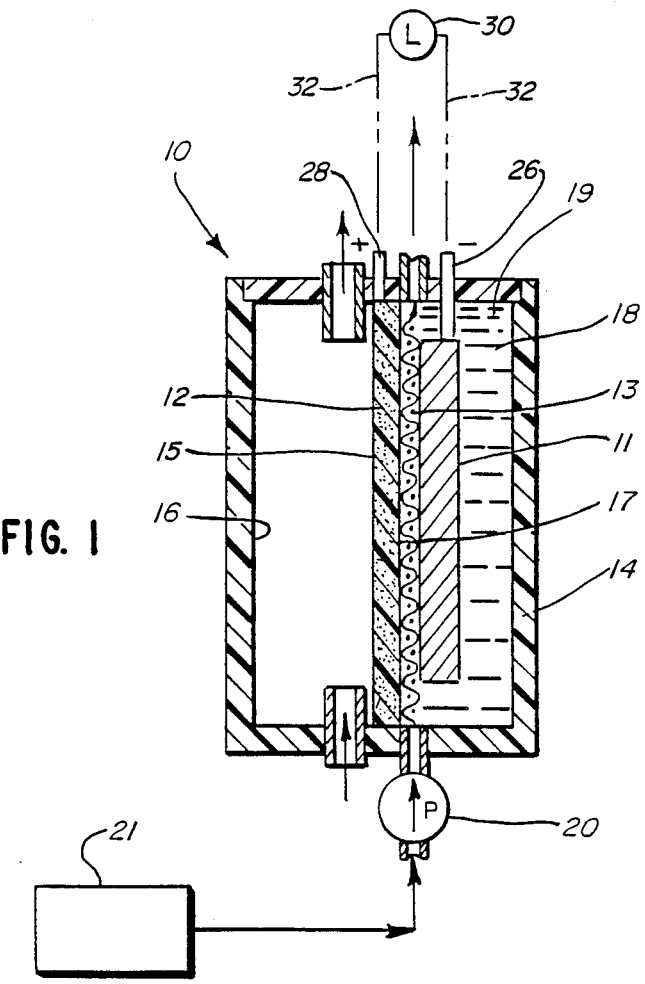
FIG. 1 is a transverse sectional view of one embodiment of an electrochemical cell in which the invention may be utilized.

FIG. 1 illustrates a typical embodiment of an electrochemical battery utilizing a gas diffusion electrode. This particular cell is an aqueous alkaline lithium-air cell. It is to be understood that the present invention is not limited to use in electrochemical batteries, nor to cells in which gas is consumed. Rather, the invention finds wide applicability in cells in which gas is either consumed or produced, via either reduction or oxidation, in which any of various electrolytes are used, etc.

The cell of FIG. 1 is described in detail in U.S. Pat. No. 4,528,249 (Jul. 9, 1985) the disclosure of which is incorporated by reference.

In FIG. 1, an electrochemical cell, generally designated 10, includes an anode 11, a gas consuming cathode 12, and a metal screen 13 interposed between the anode 11 and cathode 12 within an outer housing 14. In the embodiment of FIG. 1, the screen 13 is in electrical contact with the cathode 12, and is in mechanical (but not electrical) contact with the anode 11.

In the exemplary embodiment, the anode 11 comprises a lithium anode, which may comprise elemental lithium metal or lithium alloyed with alloying material such as small amount of aluminum.

The screen 13 is not in electrical contact with the anode 11, due to the presence of an insulating, porous lithium hydroxide (LiOH) film which is formed on the anode surface by contact thereof with humid air, and is well known in the art. It is to be noted, however, that this particular feature is peculiar to the aqueous lithium-air cell. In other types of metal-air batteries and fuel cells, either an electrically insulating porous separator layer or a simple electrolyte gas would be used. It should also be noted that the screen 13 is necessary to help restrain the gas diffusion electrode 12 against the gas pressure.

The cathode 12 is in this case an air cathode through which atmospheric air flows. Those skilled in the art, however, will recognize that such a cathode may operate with any oxygen-containing gas.

One surface 15 of the cathode 12 is exposed to ambient atmosphere (or a source of another oxygen-containing gas) in a chamber 16 of the housing 14, and the opposite surface 17 of the cathode 12 is contacted by the liquid electrolyte 18 which is flowed through a second chamber 19 in the housing 14 as by a suitable pump 20. In the illustrated embodiment, the electrolyte is provided from a reservoir 21 for suitable delivery when needed.

In FIG. 1, the anode 11 and cathode 12 each terminate in a respective terminal 26 or 28, and are connected to a load 30 through suitable circuit connections 32.

Typically, the cathode 12 comprises a structure formed of a suitable porous hydrophobic material, such as polytetrafluoroethylene (PTFE), mixed with carbon black, both pure and catalyst-containing. A preferred form of the cathode 12 is described below in connection with FIG. 2.

The screen 13 illustratively may comprise a woven metal wire screen formed of suitable non-corroding metal, which in the case of alkaline electrolyte may be nickel or silver plated nickel. If desired, the screen 13 may serve as a current collector if connected to the terminal 28.

In the embodiment of FIG. 1, liquid electrolyte, in this case an aqueous alkaline electrolyte such as aqueous lithium hydroxide, is flowed through the chamber 19 by means of the pump 20. As such, there is a pressure drop across the chamber 19 in the direction of flow.

Further, air is flowed through the chamber 16 by means not shown, and there is a small pressure drop across the chamber 16 in the direction of flow by virtue thereof. However, those skilled in the art will recognize that the pressure drop across the gas chamber 16 is small in comparison to that in the electrolyte chamber 19.

As set forth above, FIG. 1 is intended to be exemplary only, as the invention is applicable to any of a variety of types of gas diffusion electrodes and electrochemical cells.

Figure 2:
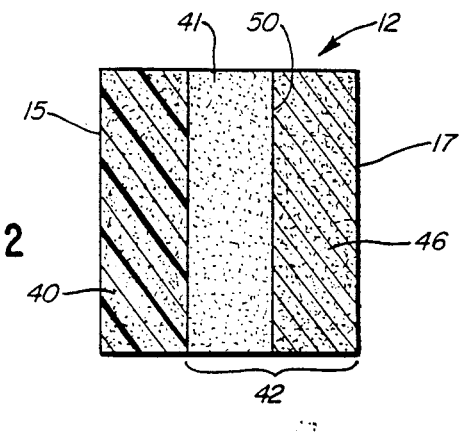
FIG. 2 is a schematic sectional view of a typical gas diffusion electrode with which the invention may be utilized.

FIG. 2 is a schematic depiction of the structure of a preferred embodiment of the cathode 12. As shown in FIG. 2, the electrode 12 is formed essentially of a two or three component laminate defining the gas contacting surface 15 and the opposed electrolyte contacting surface 17. An electronically conductive porous gas carrier layer 40 defines the gas contacting surface 15 and typically is a mixture of a hydrophobic material such as porous PTFE (e.g. Teflon brand PTFE) with a carbon black such as Shawinigan black (Chevron Chemical Co., Olefins and Derivatives Div., Houston, Tex.). A so-called "active layer" 42 comprises a layer 44 which comprises a mixture of carbon black, or catalyst supported on carbon black, and PTFE. An optional layer 46 of catalyst is disposed on the layer 44 at an interface 50. As shown in the schematic of FIG. 2, layers 44 and 46 appear to be discrete layers, but in practice may define a single layer or two layers, since the catalyst is generally adsorbed onto the surface of the material of layer 44. In some cases, the materials of the three layers 40, 44 and 46 may be intermixed in a single layer.

The entire structure of the electrode 12 of FIG. 2 is porous, generally exhibiting a porosity of 30-60%.

A typical catalyst forming the layer 44 is heat-treated cobalt tetramethoxypheny porphyrin (CoTMPP) on a carbon black such as Vulcan XC-72 (Cabot Corp., Billerica, Mass.). The heat treatment is typically done at 400–1000° C. in inert gas. The structure of CoTMPP is shown below:

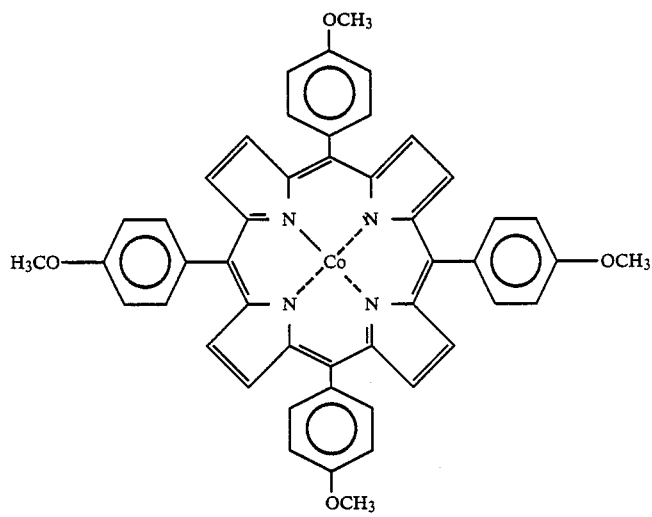

This material is a currently preferred catalytic material. Other catalysts include platinum, $MnO_2$ and transition metal macrocycles other than CoTMPP.

The function of the layer 40 is to allow ready transmission of gas to the active layer 44. Its hydrophobicity also acts to repel liquid electrolyte which exists in the active layer 44 in order to avoid leakage of the liquid electrolyte into the gas side of the cell. It also provides electronic conductivity.

The requisite consumption or generation of gas takes place in the active layer 44 where gas and liquid meet in the presence of the active material and optional catalyst, as is well known in the art.

Figure 3:
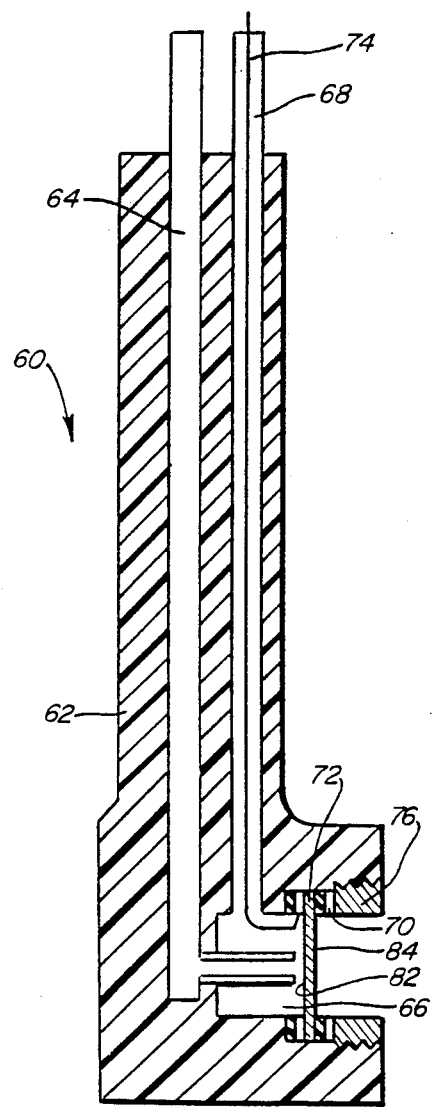
FIG. 3 is a sectional view of an electrode holder useful in testing gas diffusion electrodes.

FIG. 3 illustrates an electrode holder useful in measuring characteristics of gas consuming or generating electrodes. The electrode holder, generally designated 60, comprises a solid body 62 of a nonconductive material defining a gas inlet passage 64 communicating with a cell gas chamber 66 which in turn communicates with a gas outlet passage 68. (A typical material of construction for the body 62 is 3M's Kel-F brand choloro fluorocarbon polymer.) An annular electrode seat 70 is defined in the body 62 in order to position an electrode assembly (not shown in FIG. 3) which includes a gas diffusion electrode, generally designated 72, adjacent the cell chamber 66. A conductive (e.g. platinum) wire 74 contacts the seat 70 and extends therefrom through the outlet passage 68. A threaded plug 76 of the same material as the body 62 retains an electrode assembly 80 (shown in FIG. 4) in place in the body 62.

Figure 4:
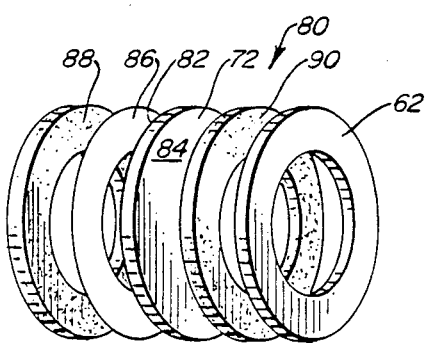
FIG. 4 is a schematic exploded perspective view of an electrode assembly adapted for use with the electrode holder of FIG. 3.

FIG. 4 illustrates the electrode assembly, generally designated 80, which includes the gas diffusion electrode 72 of FIG. 3. The electrode 72 is shown in schematic form in FIG. 4 and formed as a cylindrical disk defining gas and electrolyte contacting surfaces 82 and 84 respectively. These surfaces are analogous to surfaces 15 and 17 of FIG. 1. An annular conductive metal (e.g. platinum) ring 86 is disposed on the gas surface 82 between the gas surface 82 and an annular rubber gasket 88. A similar rubber gasket 90 is disposed on the electrolyte side of the electrode 72 between the electrolyte contacting surface 84 and an annular ring 92 of the same material as the body 62.

When the assembly 80 is in place in the seat 70 of the electrode holder 60, the ring 86 is in electrical contact with the wire 74 and acts as a current collector.

Figure 5:
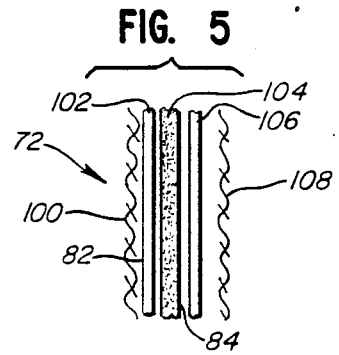
FIG. 5 is a schematic transverse sectional view of an electrode as used in FIGS. 3 and 4.

The electrode 72 as shown in FIGS. 3 and 4 is schematic and these figures do not illustrate certain components such as the hydrophobic backing layer and associated screens. FIG. 5 illustrates an exploded sectional schematic view of a typical embodiment of the diffusion electrode 72. A silver plated nickel screen 100 is adjacent to and in contact with an electronically conductive hydrophobic backing layer 102, typically of Teflon brand PTFE plus carbon black, which defines the surface 82. An active layer 104, which may include a catalyst on carbon black, is adjacent to the layer 102 and defines the surface 84. A hydrophilic layer 106 is applied to the surface 84 and is in contact with a steel reinforcement screen 108. The layer 106 is described in detail below.

When constructed, the screen 100 is not in physical or electrical contact with the ring 86 and thus merely acts as a physical restraint. The gas inlet passage 64 and gas outlet passage 68 are connected with gas flow regulating means (not shown) which regulate the flow of gas through the passages 64 and 68 and the cell chamber 66, and thus the gas pressure in the chamber 66.

Those skilled in the art will recognize that the screens 100 and 108 may be embedded in the layers 102 or 106, respectively, and that the layers 102 and 104 may form a single homogenous layer if desired.

When the electrode 72 is in place in the assembly 80 in the electrode holder 60, a central circular segment of each of the electrode surfaces 82 and 84 is exposed to gas and electrolyte sources, respectively. The electrode holder body 62 is positioned in a test cell such that the electrode surface 84 is exposed to a flowing or non-flowing (e.g. stirred) electrolyte. The remainder of this cell and associated temperature control means, etc. are omitted for clarity.

For operation at elevated gas/electrolyte differential pressures, the steel screen 108 acts as a reinforcement to prevent physical rupture of the electrode 72. Flow-through of gas from the cell chamber 66 through the electrode 72 into the electrolyte side of the cell is prevented by the layer 106 as described below.

The layer 106 directly overlies the active layer surface 84 of the electrode. The layer 106 comprises a hydrophilic ionic polymer covered by a membrane of a hydrophilic ion exchange resin which is substantially impermeable to the gross passage of gas. The material of the layer 106 is ionically conductive to hydroxide (OH) ions as well as water. It is also possible for bulk electrolyte to slowly diffuse through the membrane. The electrode 72 may be effectively wetted through the layer 106, while the layer 106 is virtually impermeable to gas flow.

The ionic polymer is applied directly to the electrolyte contacting surface as by application of an aqueous or organic liquid solution of the polymer. Preferably, for use with alkaline electrolytes, the ionic polymer is a cationic polymer (anion exchange), and the membrane comprises an anion exchange resin (i.e. the membrane includes cationic and/or nonionic groups in the polymer chain or pendant therefrom). For use with acidic electrolytes, the ionic polymer is preferably anionic (cation exchange) and is used in conjunction with a cationic exchange resin (i.e. a resin including anionic and/or nonionic groups). A preferred ionic polymer for use with alkaline electrolytes is poly (dimethyl diallyl ammonium chloride), (PDMDAAC, 15% solids in water, Polysciences, Warrington, Pa.). The combination of the ionic polymer and the membrane does not allow the macroscopic flow of gases, but does contain and transport ions, thus creating a pressure tolerant electrode.

The combination of the ionic polymer layer and the ion exchange resin membrane is synergistic, in that the ionic polymer tends to keep the membrane from "bowing" away from the active layer under high gas pressures, and the membrane prevents the ionic polymer from washing off in electrolytes in which the polymer may be soluble.

A wide variety of ion exchange resin membrane materials are useful, and include those wherein a polymer backbone is grafted, as with a quaternized vinyl benzyl amine. Such backbones include fluorinated polymers such as polytetrafluoroethylene (PTFE). Other useful membranes include quaternized ammonium polymers such as tetraalkyl ammonium polymers and perfluorinated polymers such as perfluorosulfonic acid polymers. A preferred type of perfluorinated polymer is sold by DuPont under the trademark NAFION.

Perfluorinated resins have the dual advantages of high oxygen solubility and extemely high chemical stability.

In addition to NAFION polymer, a preferred ionic polymer for use in acidic electrolytes is poly (styrene sulfonic acid) (PSSA, 30% solids in water, Polysciences).

In either case, the ionic polymer migrates into the body of the electrode and into the ion exchange resin membrane. It is believed that the presence of the ionic polymer may "open up" the membrane such that the degree and extent of crosslinking of the membrane is effectively decreased. This should not significantly alter the operation of the membrane, however.

The presence of the ionic polymer may also effectively occlude any physical pinholes which may be present in the ion exchange membrane, especially on contact with aqueous electrolytes in which such polymers are swellable.

By the use of the invention, it is possible to achieve extremely high gas/electrolyte differential pressures and to achieve high voltages, i.e. minimize the loss of voltage due to the barrier.

EXAMPLES

The following specific examples are intended to illustrate the practice of the invention and should not be considered to be limiting in any way.

The following generalized experimental procedure was used to prepare the gas diffusing electrode.

Cobalt tetramethoxyphenyl porphyrin (CoTMPP) was adsorbed on Vulcan XC-72 carbon (Cabot) by agitating a suspension of the latter in a solution of $10^{-4}$ M CoTMPP in acetone for at least 24 hours. The amount of the adsorbed macrocycle was calculated by spectrophotometrically determining its loss from the filtered solution. The solid catalyst/carbon was airdried and then heat-treated to 450° C. in a horizontal tube furnace under continuous flow of purified argon.

Porous gas-fed electrodes were fabricated as follows: dilute ~2 mg/mL) Teflon T30 B aqueous suspension (DuPont) was slowly added to an aqueous suspension of the catalyst/carbon while the latter was ultrasonically agitated. The mixed suspension was then filtered out with a 1μm pore size polycarbonate filter membrane. The paste was worked with a spatula until slightly rubbery. The paste was shaped into a 1.75 cm diameter disk in a stainless steel die using hand pressure. This disk was then applied to another disk, ~0.5 mm thick, of Teflon-carbon black hydrophobic porous sheet material (Eltech Systems Corp., Fairport Harbor, Ohio), which contained a silver plated Ni mesh. This dual layer disk was pressed at 380 kg cm$^{-2}$ at room temperature and then heat-treated at 290° C. for 2 hours in flowing helium.

The gas-fed electrode was placed in a Teflon- Kel-F electrode holder as shown in FIG. 3. The gas ($O_2$ or air) pressure was applied to the back-side (hydrophobic layer) of the electrode and was monitored at the outlet. A needle valve at the outlet was used to regulate the gas pressure.

The $O_2$ reduction measurements for the gas-fed electrodes were done galvanostatically in a concentrated alkaline electrolyte (0.5 M LiOH in 2:1 v/v 50% NaOH and 45% KOH) at 80° C. with a research potentiostat (Stonehart Associates, Model BC1200). This potentiostat is equipped with positive feedback IR drop compensation and correction circuits. The IR drop correction adjustment is made while monitoring the potential on an oscilloscope, with the current repetitively interrupted for 0.1 ms every 1.1 ms. This procedure corrects for any IR drop that is external to the electrode itself. Nickel foil was used as the counter electrode and a Hg/HgO, OH$^-$ reference electrode was used. The polarization curves were recorded under steady-state conditions.

For purposes of comparison, an air cathode was prepared by applying a NAFION polymer membrane (about 0.018 millimeter thick) and a stainless steel screen over the active layer of an electrode as shown in FIGS. 2 and 4-5. No ionic polymer layer was present. This electrode was tested in oxygen reduction at one atmosphere (no pressure differential between gas and electrolyte sides) in a 50 wt. percent sodium hydroxide aqueous electrolyte at 80°-83° C. FIG. 6 shows the polarization curve. The performance is poor, as expected, because the hydroxide ion has very low mobility in NAFION polymer, which is a cation exchange membrane.

In comparison, another electrode was prepared by coating the electrode active surface with pDMDAAC and then by covering the ionic polymer layer with a causticresistant anion exchange membrane (AR 108-401) from Ionics, Inc., Watertown, Mass. This electrode was tested at a differential pressure of 5 psi with both air and oxygen using an electrolyte as described above at 80° C. The polarization curves are shown in FIG. 7. The data represented by the curves were obtained with both increasing and decreasing current densities. The potential exhibited at 100 mA/cm$^2$ is excellent and is only ~15mV more negative than that obtained for an electrode tested without the polymer and membrane.

Figure 8:
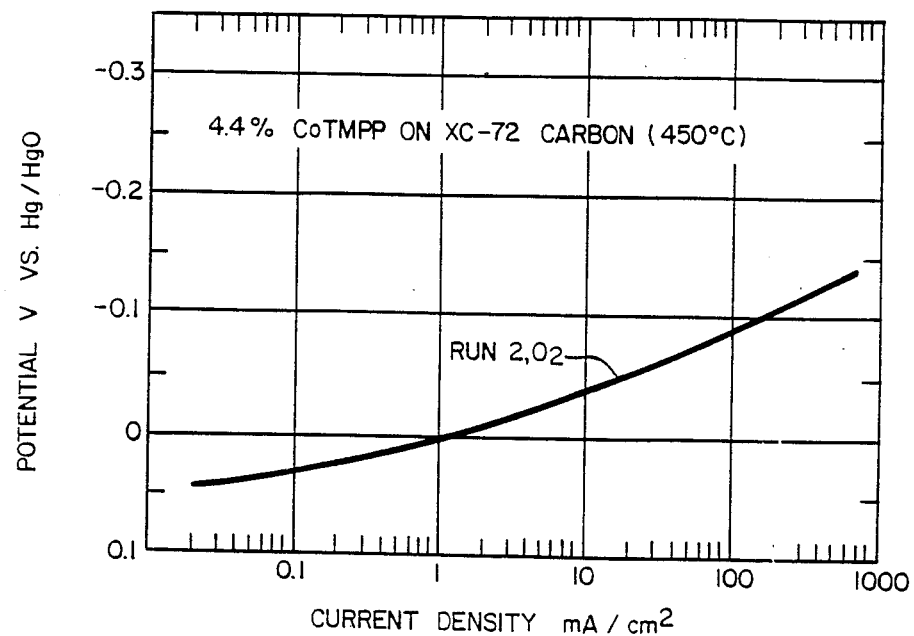
FIG. 8 is a polarization curve exhibited by another embodiment of the electrode of the invention.

Another air cathode assembly was prepared first by coating with a thin layer (~1.25 mg/cm$^2$, dry weight) of pDMDAAC and then pressing (~380 kg cm$^{-2}$) on a disk of tetraalkylammonium polymer membrane material (Ionics, Inc.) over the active layer. This modified electrode can withstand a gas-side overpressure of ~75.0 kPa without gas blow-through. This overpressure tolerance is ~20-fold higher than is expected for a typical unmodified air cathode. The $O_2$ reduction polarization curve is shown in FIG. 8.

Operation at high current densities (e.g. up to about 1 A/cm$^2$ or more) is possible according to the invention.

Examination of the polarization curves presented above shows that according to the invention, very great increases in current (i.e. in current density) are available with only minor increases in the potential driving force over a wide range of current densities. (The Tafel plots display relatively low slopes, ~45 mV/decade.)

The foregoing detailed description is given for clearness of understanding, and no unnecessary limitations are to be inferred therefrom, as modifications within the scope of the invention will be obvious to those skilled in the art.

We claim:

1. A gas diffusion electrode adapted for use in a gas generating or consuming electrochemical cell utilizing a liquid electrolyte, said electrode comprising an electronically conductive and electrochemically active porous body defining respective gas and electrolyte contacting surfaces and an ionomeric ionically conductive gas impermeable layer covering substantially the entire said electrolyte contacting surface, said layer comprising a layer of a hydrophilic ionic polymer applied as a liquid solution directly to said entire electrolyte contacting surface and a membrane of a hydrophilic ion exchange resin directly overlying said polymer layer.

2. The electrode of claim 1 wherein said resin comprises a polymer backbone grafted with quaternized vinyl benzene amine.

3. The electrode of claim 2 wherein said polymer backbone comprises a fluorinated polymer.

4. The electrode of claim 3 wherein said polymer backbone comprises polytetrafluoroethylene.

5. The electrode of claim 1 wherein said resin comprises a quaternized ammonium polymer 6. The electrode of claim 5 wherein said resin comprises a tetraalkylammonium polymer.

7. The electrode of claim 1 wherein said ionic polymer is a cationic polymer and said membrane comprises an anion exchange resin.

8. The electrode of claim 7 wherein said polymer comprises poly(dimetnyl diallyl ammonium chloride).

9. The electrode of claim 8 wherein said membrane comprises a perfluorinated polymer.

10. The electrode of claim 9 wherein said perfluorinated polymer comprises a perfluorosulfonic acid polymer.

11. The electrode of claim 1 wherein said polymer is an anionic polymer and said membrane comprises a cation exchange resin.

12. The electrode of claim 11 wherein said polymer comprise poly (styrene sulfonic acid).

13. The electrode of claim 1 wherein said porous body comprises a laminate of a porous hydrophobic layer defining said gas contacting surface, and a porous active layer defining said electrolyte contacting surface, said active layer comprising an electrochemically active material.

14. The electrode of claim 13 wherein said electrochemically active material comprises carbon.

15. The electrode of claim 13 wherein a catalyst is adsorbed on said active material.

16. The electrode of claim 15 wherein said catalyst is cobalt tetramethoxyphenyl porphyrin.

17. An electrochemical cell, comprising:
(a) a gas diffusion electrode comprising an electronically conductive and electrochemically active porous body defining respective gas and electrolyte contacting surfaces, and an ionomeric ionically conductive gas impermeable layer covering substantially the entire said electrolyte contacting surface, said layer comprising a layer of a hydrophilic ionic polymer applied as a liquid solution directly to said entire electrolyte contacting surface and a membrane of a hydrophilic ion exchange resin directly overlying said polymer layer;

(b) a counter electrode spaced from said gas diffusion electrode;

(c) a liquid electrolyte in contact with said counter electrode and with said membrane on said electrolyte contacting surface of said gas diffusion electrode;

(d) either a gas to be consumed via oxidation or reduction or gas formed via electrolytic generation in contact with said gas contacting surface of said gas diffusion electrode; and, (e) circuit connections between said gas diffusion electrode and said counter electrode.

18. The cell of claim 17 wherein said gas is an oxygen containing gas.

19. The cell of claim 18 wherein said gas is air.

20. The cell of claim 17 wherein at least one of said liquid electrolyte and said gas are flowed through said cell.

21. The cell of claim 17 wherein said resin comprises a polymer backbone grafted with quaternized vinyl benzene amine.

22. The cell of claim 21 wherein said polymer backbone comprises a fluorinated polymer.

23. The cell of claim 22 wherein said polymer backbone comprises polytetrafluoroethylene.

24. The cell of claim 17 wherein said resin comprises a quaternized ammonium polymer.

25. The cell of claim 24 wherein said resin comprises a tetraalkylammonium polymer.

26. The cell of claim 17 wherein said ionic polymer is a cationic polymer and said membrane comprises an anion exchange resin.

27. The cell of claim 26 wherein said polymer comprises poly (dimethyl diallyl ammonium chloride).

28. The cell of claim 27 wherein said membrane comprises a perfluorinated polymer.

29. The cell of claim 28 wherein said perfluorinated polymer comprises a perfluorosulfonic acid polymer.

30. The cell of claim 17 wherein said polymer is an anionic polymer and said membrane comprises a cation exchange resin.

31. The cell of claim 30 wherein said polyner comprises poly (styrene sulfonic acid).

32. The cell of claim 17 wherein said porous body comprises a laminate of a porous hydrophobic layer defining said gas contacting surface, and porous active layer defining said electrolyte contacting surface, said active layer comprising an electrochemically active material.

33. The cell of claim 32 wherein said electrochemically active material comprises carbon.

34. The cell of claim 32 wherein a catalyst is adsorbed on said active material.

35. The cell of claim 34 wherein said catalyst is cobalt tetramethoxyphenyl porphyrin.

* * * * *